(12) United States Patent
Kishi et al.

(10) Patent No.: US 11,333,278 B2
(45) Date of Patent: May 17, 2022

(54) PIPE-JOINING CENTERING DEVICE

(71) Applicant: KUBOTA CORPORATION, Osaka (JP)

(72) Inventors: Shozo Kishi, Amagasaki (JP); Keita Oda, Amagasaki (JP); Ryunosuke Tanaka, Amagasaki (JP); Hideki Nakaya, Amagasaki (JP)

(73) Assignee: KUBOTA CORPORATION, Osaka (JP)

( * ) Notice: Subject to any disclaimer, the term of this patent is extended or adjusted under 35 U.S.C. 154(b) by 73 days.

(21) Appl. No.: 16/722,434

(22) Filed: Dec. 20, 2019

(65) Prior Publication Data
US 2020/0208765 A1    Jul. 2, 2020

(30) Foreign Application Priority Data
Dec. 27, 2018 (JP) .............................. JP2018-243846

(51) Int. Cl.
*F16L 25/08* (2006.01)
*F16L 25/06* (2006.01)

(52) U.S. Cl.
CPC ............. *F16L 25/08* (2013.01); *F16L 25/065* (2013.01)

(58) Field of Classification Search
CPC ......... F16L 25/065; F16L 25/08; F16L 21/04; F16L 21/08
USPC .................................................. 285/91, 337
See application file for complete search history.

(56) References Cited

U.S. PATENT DOCUMENTS

| | | | | |
|---|---|---|---|---|
| 2,145,645 A | * | 1/1939 | Byers | F16L 21/04 |
| 5,431,453 A | * | 7/1995 | Yamashita | F16L 21/08 |
| 5,544,922 A | * | 8/1996 | Shumard | F16L 25/065 |
| | | | | 285/337 |
| 6,173,993 B1 | * | 1/2001 | Shumard | F16L 25/065 |
| | | | | 285/337 |
| 7,997,628 B1 | * | 8/2011 | Smith, Jr. | F16L 25/065 |
| 2002/0037194 A1 | * | 3/2002 | Gentile, Jr. | F16L 25/065 |
| 2003/0085566 A1 | * | 5/2003 | Rex | F16L 21/08 |
| | | | | 285/337 |
| 2006/0012172 A1 | * | 1/2006 | Kennedy | F16L 21/08 |
| 2011/0291409 A1 | * | 12/2011 | Kennedy, Jr. | F16L 25/065 |
| 2016/0341343 A1 | * | 11/2016 | Bowsher | F16L 21/08 |

FOREIGN PATENT DOCUMENTS

JP          H11-351449 A    12/1999

* cited by examiner

*Primary Examiner* — Zachary T Dragicevich
(74) *Attorney, Agent, or Firm* — Kusner & Jaffe

(57) ABSTRACT

A pipe-joining centering device aligns, with an axial center of one pipe, an axial center of another pipe when a spigot of the other pipe is to be inserted into a socket of the one pipe. The pipe-joining centering device includes a support member configured to support an end part of the spigot. The support member is tiltable in a pipe radial direction between an inner peripheral surface of the socket and an outer peripheral surface of the spigot. The pipe-joining centering device also includes a position adjustment member configured to tilt the support member in the pipe radial direction. The support member and the position adjustment member are supported on the inner peripheral surface of the socket.

4 Claims, 11 Drawing Sheets

PIPE-JOINING CENTERING DEVICE

FIELD OF THE INVENTION

The present invention relates to a pipe-joining centering device configured to align, with the axial center of one pipe, the axial center of another pipe when the pipes are to be joined with each other by inserting a spigot of the other pipe into a socket of the one pipe.

BACKGROUND OF THE INVENTION

In a conventional pipe centering device of this kind as illustrated in, for example, FIG. 14, a base portion 102 is fixed on a foundation 101, a holder 104 configured to hold a pipe 103 is provided above the base portion 102 in a manner freely movable upward and downward, and an adjustment member 105 configured to move the holder 104 upward and downward is provided between the base portion 102 and the holder 104.

With this configuration, when the pipe 103 is placed on the holder 104 and the adjustment member 105 is actuated to move the holder 104 upward and downward, the pipe 103 is moved in the up-down direction, thereby performing centering.

Such a centering device as the aforementioned is disclosed in Japanese Patent Laid-open No. 11-351449.

Although the base portion 102 of a centering device 100 is fixed to the foundation 101 in the aforementioned conventional configuration, the base portion 102 is installed on the ground in some cases when, for example, the pipe is laid in the ground. When the ground has irregularities or is formed of soft dirt or the like, the base portion 102 sinks into the ground or tilts due to downward reaction force F generated when the adjustment member 105 is actuated to move the holder 104 upward. As a result, the installation posture of the base portion 102 is likely to be unstable, and it is potentially difficult to perform accurate centering in the up-down direction.

Typically, when one pipe is joined with another pipe by inserting a spigot of the one pipe into a socket of the other pipe, the axial center of the one pipe is likely to shift in the up-down direction relative to the axial center of the other pipe due to the weight of the one pipe. Thus, more accurate centering is required to be performed in the up-down direction than in the right-left direction.

SUMMARY OF THE INVENTION

The present invention is intended to provide a pipe-joining centering device capable of performing accurate centering in the up-down direction with a simple structure.

To achieve the aforementioned intention, a first aspect of the present invention is a pipe-joining centering device configured to align, with an axial center of one pipe, an axial center of another pipe when a spigot of the other pipe is to be inserted into a socket of the one pipe, the pipe-joining centering device including: a support member configured to support an end part of the spigot and tiltable in a pipe radial direction between an inner peripheral surface of the socket and an outer peripheral surface of the spigot; and a position adjustment member configured to tilt the support member in the pipe radial direction, wherein the support member and the position adjustment member are supported on the inner peripheral surface of the socket.

With this configuration, the end part of the spigot is supported by the support member and moved in the pipe radial direction as the support member is tilted in the pipe radial direction by using the position adjustment member. Accordingly, the axial center of the other pipe can be aligned with the axial center of the one pipe.

In this case, since the support member and the position adjustment member are supported on the inner peripheral surface of the socket, any reaction force generated when the end part of the spigot is supported by the support member and moved in the pipe radial direction is received by the inner peripheral surface of the socket. Accordingly, the posture of the support member is stabilized, and accurate centering can be performed in the up-down direction.

According to a second aspect of the present invention, the socket has an opening at an end part, the support member has one end part facing a socket opening side and another end part facing a socket bottom side and is tiltable so that the one end part is supported on the inner peripheral surface of the socket and the other end part is positioned higher than the one end part, and the position adjustment member changes a tilt angle of the support member relative to the inner peripheral surface of the socket.

With this configuration, when the support member is provided between a lower part of the inner peripheral surface of the socket and a lower part of the outer peripheral surface of the spigot and the tilt angle of the support member is changed by using the position adjustment member, the end part of the spigot is supported by the support member and moved in the up-down direction. Accordingly, the axial center of the other pipe can be aligned with the axial center of the one pipe.

According to a third aspect of the present invention, the position adjustment member penetrates through the support member in the pipe radial direction and is screwed to the support member through a screw at a penetration part, a leading end part of the position adjustment member in the pipe radial direction contacts the inner peripheral surface of the socket, and as the position adjustment member is rotated, the support member is displaced by the screw and the tilt angle of the support member is changed.

With this configuration, when the support member is provided between the lower part of the inner peripheral surface of the socket and the lower part of the outer peripheral surface of the spigot and the tilt angle of the support member is changed by rotating the position adjustment member, the end part of the spigot is supported by the support member and moved in the up-down direction. Accordingly, the axial center of the other pipe can be aligned with the axial center of the one pipe.

In addition, since the pipe-joining centering device has a simple structure including the support member and the position adjustment member of a screw type, reduction in the size and weight of the pipe-joining centering device can be achieved. Moreover, since the support member is displaced by the screw and the tilt angle thereof is changed, the tilt angle of the support member can be gradually changed in accordance with the pitch of the screw. Accordingly, the position of the axial center of the other pipe relative to the axial center of the one pipe can be easily finely adjusted.

According to a fourth aspect of the present invention, the position adjustment member includes an adjustment member body, and a spherical body provided at a leading end part of the adjustment member body, and the spherical body contacts the inner peripheral surface of the socket and is rotatable relative to the adjustment member body.

With this configuration, since the adjustment member body is rotated relative to the spherical body contacting the inner peripheral surface of the socket when the position adjustment member is rotated to change the tilt angle of the support member, the inner peripheral surface of the socket can be prevented from being damaged when the spherical body slidably contacts the inner peripheral surface of the socket.

According to a fifth aspect of the present invention, the support member is sandwiched between a spacer and the inner peripheral surface of the socket, the spacer being configured to maintain a predetermined interval between a basal end part of the socket and the end part of the spigot, and the position adjustment member is inserted into a through-hole formed in the spacer.

With this configuration, since the support member is sandwiched between the spacer and the inner peripheral surface of the socket, positional shift of the support member in the pipe circumferential direction and the pipe axial direction can be prevented. In addition, since the position adjustment member is inserted into the through-hole of the spacer, positional shift of the position adjustment member in the pipe circumferential direction and the pipe axial direction can be prevented. Accordingly, positional shift of the pipe-joining centering device in the pipe circumferential direction and the pipe axial direction can be prevented.

When the spacer and the pipe-joining centering device are removed after centering is performed and the one pipe and the other pipe are joined with each other, the basal end part of the socket and the end part of the spigot are separated from each other at the predetermined interval. In this manner, the spacer has a function to position the pipe-joining centering device in addition to a function to maintain the predetermined interval between the basal end part of the socket and the end part of the spigot.

According to the present invention as the aforementioned, a pipe-joining centering device has a simple structure and can be used to perform accurate centering in the up-down direction.

DETAILED DESCRIPTION

An embodiment of the present invention will be described below with reference to the accompanying drawings.

Figure 1:
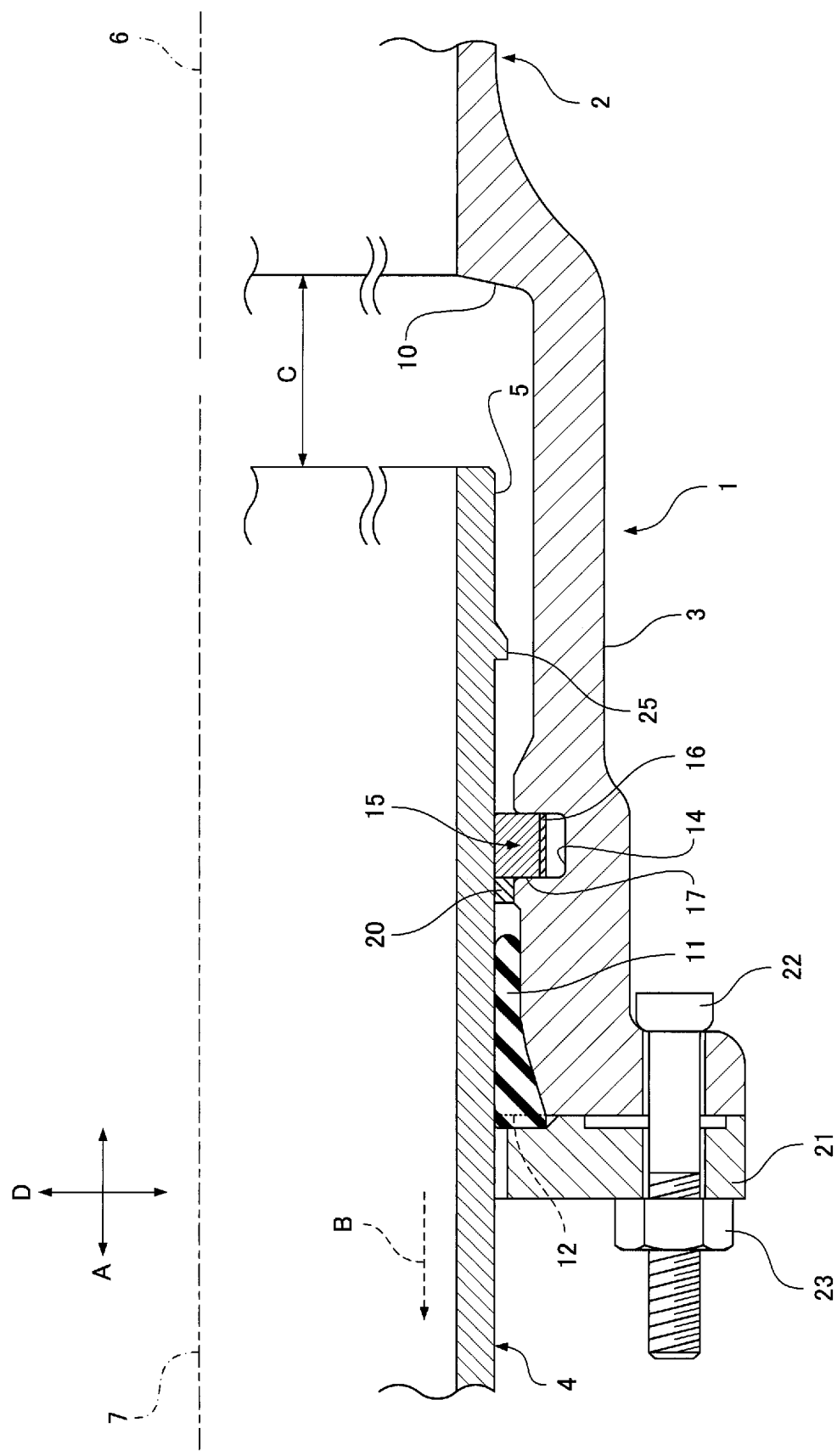
FIG. 1 is a cross-sectional view of pipe joints joined with each other by using a centering device in an embodiment of the present invention.

As illustrated in FIG. 1, reference sign 1 denotes an exemplary pipe joint of a quake-resistant pipe obtained when pipes 2 and 4 are joined with each other by inserting a spigot 5 formed at an end part of the other pipe 4 into a socket 3 formed at an end part of the one pipe 2. The pipes 2 and 4 are ductile cast iron pipes, and for example, buried in the ground. The following first describes the structure of the pipe joint 1.

A bottom end surface 10 (exemplary basal end part) is formed on the entire circumference of a bottom stepped part of the socket 3. In addition, an annular seal member 11 that seals the gap between the socket 3 and the spigot 5 is inserted between the inner peripheral surface of the socket 3 and the outer peripheral surface of the spigot 5 from an opening end 12 of the socket 3. The seal member 11 is made of an elastic material such as rubber.

In addition, a lock-ring housing groove 14 is formed on the entire circumference of the inner peripheral surface of the socket 3. The lock-ring housing groove 14 is positioned between the seal member 11 and the bottom end surface 10 of the socket 3 in a pipe axial direction A. The lock-ring housing groove 14 houses a lock ring 15, and a lock-ring pressing member 16 that presses (wraps) the lock ring 15 against (around) the outer peripheral surface of the spigot 5. The lock ring 15 is an annular ring having a one-slit structure in which the lock ring 15 is divided at one place, and has a side surface 17 facing the seal member 11 in the pipe axial direction A. The lock-ring pressing member 16 is a substantially annular member having an elastic structure.

A backup ring 20 is provided between the lock ring 15 and the seal member 11 in the pipe axial direction A. The backup ring 20 is a one-slit structure ring for preventing excessive insertion of the seal member 11 to the bottom side of the socket 3. The backup ring 20 is externally fitted to the spigot 5 and contacts the side surface 17 of the lock ring 15.

An annular press ring 21 that presses the seal member 11 toward the bottom side of the socket 3 is attached to the opening end 12 of the socket 3 through a plurality of T-head bolts 22 and a plurality of nuts 23.

A protrusion 25 is formed on the entire circumference of the outer peripheral surface of the spigot 5. The protrusion 25 is positioned between the lock ring 15 and the bottom end surface 10 of the socket 3. When the other pipe 4 is moved in a disengagement direction B by earth quake or the like, the protrusion 25 engages with the lock ring 15 from the bottom side of the socket 3 to prevent disengagement of the other pipe 4 from the one pipe 2.

When the one pipe 2 and the other pipe 4 are joined with each other, the bottom end surface 10 of the socket 3 and the end part of the spigot 5 are separated from each other at a predetermined interval C.

Figure 2:
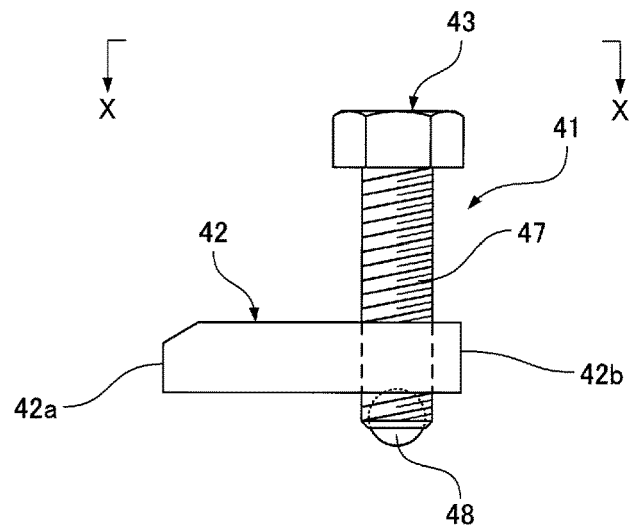
FIG. 2 is a side view of the centering device.
Figure 3:
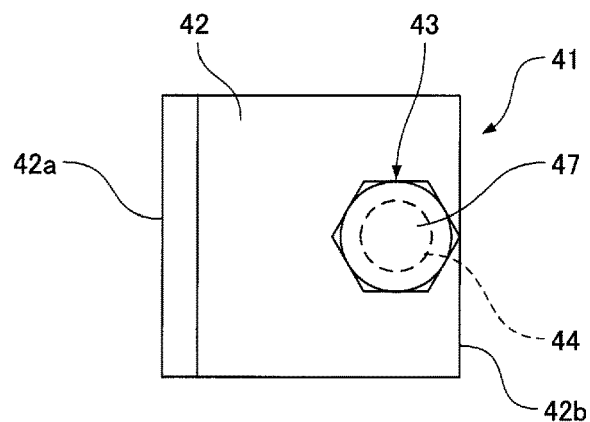
FIG. 3 is a diagram in the direction of arrow X-X in FIG. 2.
Figure 4:
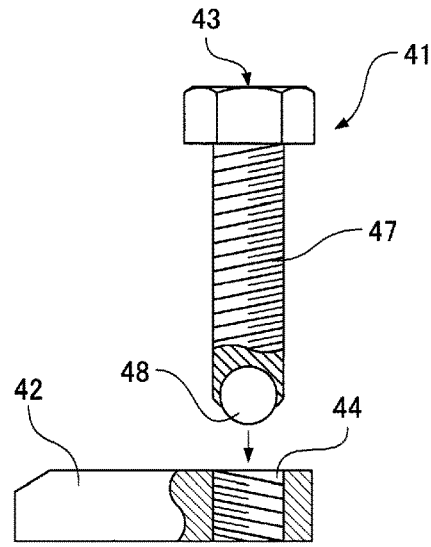
FIG. 4 is a disassembled side view taken along a section of part of the centering device.

As illustrated in FIGS. 2 to 4, a device denoted by reference sign 41 is a pipe-joining centering device used when the one pipe 2 and the other pipe 4 are joined with each other. The following describes the configuration of this centering device 41.

The centering device 41 includes a support member 42 having a flat plate shape, and a position adjustment member 43. The support member 42 is provided with a screw hole 44 penetrating therethrough in the thickness direction. A female screw is formed on the inner periphery of the screw hole 44.

The position adjustment member 43 includes a bolt body 47 (exemplary adjustment member body), and a rotatable spherical body 48 provided at the leading end part of the bolt body 47.

When centering work of aligning an axial center 7 of the other pipe 4 with an axial center 6 of the one pipe 2 is to be performed, the centering device 41 is set in the socket 3 so that the centering device 41 is positioned between the bottom end surface 10 of the socket 3 and the end part of the spigot 5 as illustrated in FIGS. 5 to 8.

Specifically, the support member 42 has one end part 42a facing the opening end 12 side of the socket 3 and another end part 42b facing the bottom side of the socket 3 and is tiltable in an up-down direction D (exemplary pipe radial direction) relative to the inner peripheral surface of the socket 3 so that the one end part 42a is supported on the inner peripheral surface of the socket 3 and the other end part 42b is position higher than the one end part 42a. The one end part 42a of the support member 42 is inserted between the inner peripheral surface of the socket 3 and the outer peripheral surface of the end part of the spigot 5.

The position adjustment member 43 is inserted into the screw hole 44 and supported on the inner peripheral surface of the socket 3 through the support member 42 in the up-down direction D, and a male screw of the bolt body 47 is screwed with the female screw of the screw hole 44. The spherical body 48 of the position adjustment member 43 contacts the inner peripheral surface of the socket 3 and is rotatable relative to the bolt body 47.

As the position adjustment member 43 is rotated, the support member 42 is displaced by the male screw of the bolt body 47 and the female screw of the screw hole 44 screwed with each other, the other end part 42b of the support member 42 is moved in the up-down direction, and a tilt angle E of the support member 42 relative to the inner peripheral surface of the socket 3 is changed.

In addition, an annular spacer 53 is detachably provided on the inner periphery of the socket 3 to maintain the predetermined interval C between the bottom end surface 10 of the socket 3 and the end part of the spigot 5 while being sandwiched between the bottom end surface 10 of the socket 3 and the end part of the spigot 5. The spacer 53 is made of an elastic body such as rubber.

A through-hole 54 penetrating in the up-down direction D is formed between both end parts of the spacer 53 in the pipe axial direction A. The support member 42 is sandwiched between the spacer 53 and the inner peripheral surface of the socket 3, and the position adjustment member 43 is inserted into the through-hole 54 of the spacer 53.

The following describes a method of joining the one pipe 2 and the other pipe 4 with each other by using the centering device 41.

Figure 11:
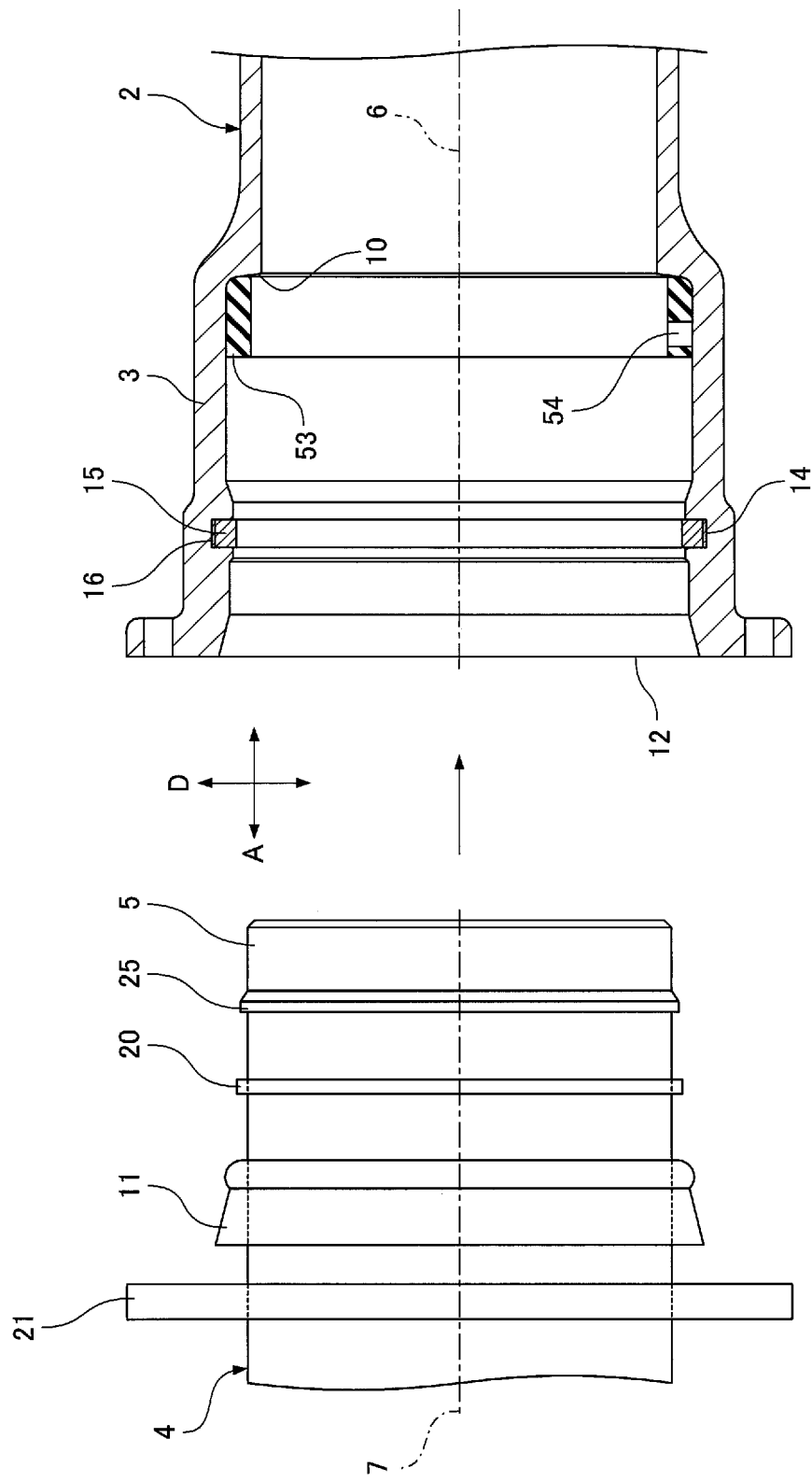
FIG. 11 is a cross-sectional view illustrating the procedure of joining pipes by using the centering device.

As illustrated in FIG. 11, the lock ring 15 and the lock-ring pressing member 16 are housed in the lock-ring housing groove 14, and the seal member 11, the backup ring 20, and the press ring 21 are externally fitted to the spigot 5 in advance. In this case, the lock ring 15 is held in the lock-ring housing groove 14 while the diameter of the lock ring 15 is increased by using an appropriate diameter increasing jig (not illustrated) in advance.

Figure 8:
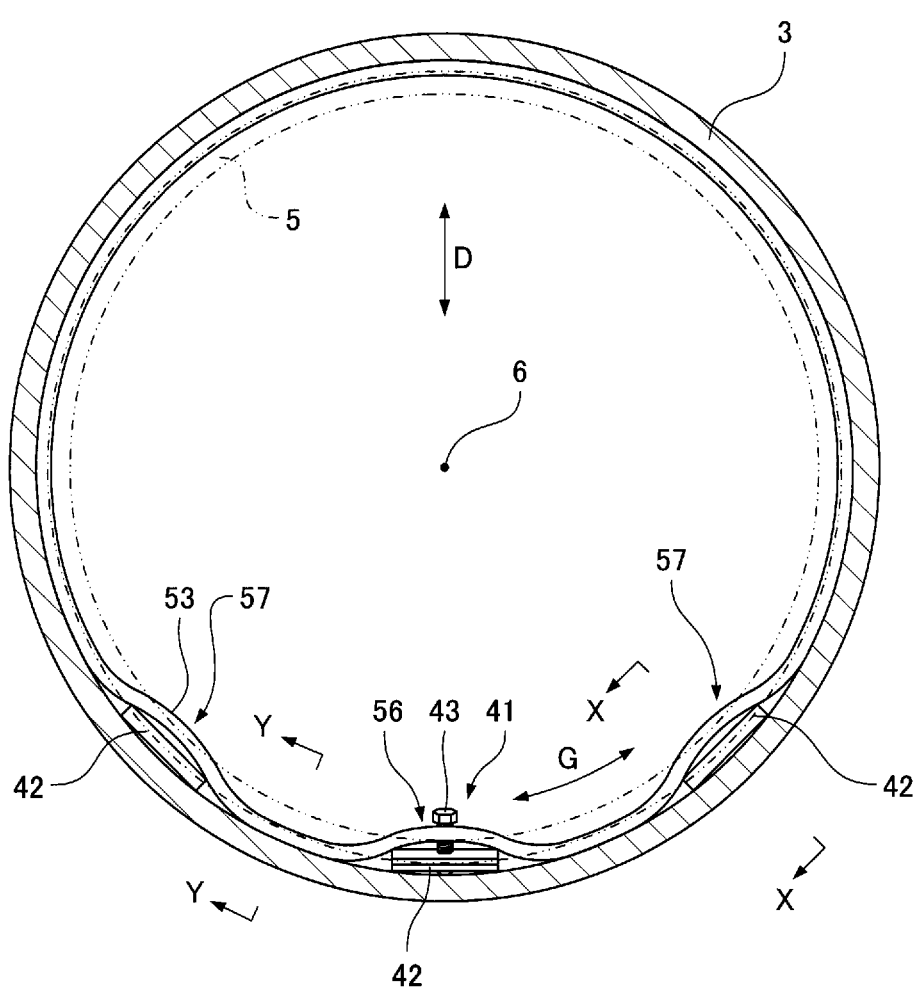
FIG. 8 is a diagram illustrating installation places of the centering device and a support member in a pipe circumferential direction.
Figure 9:
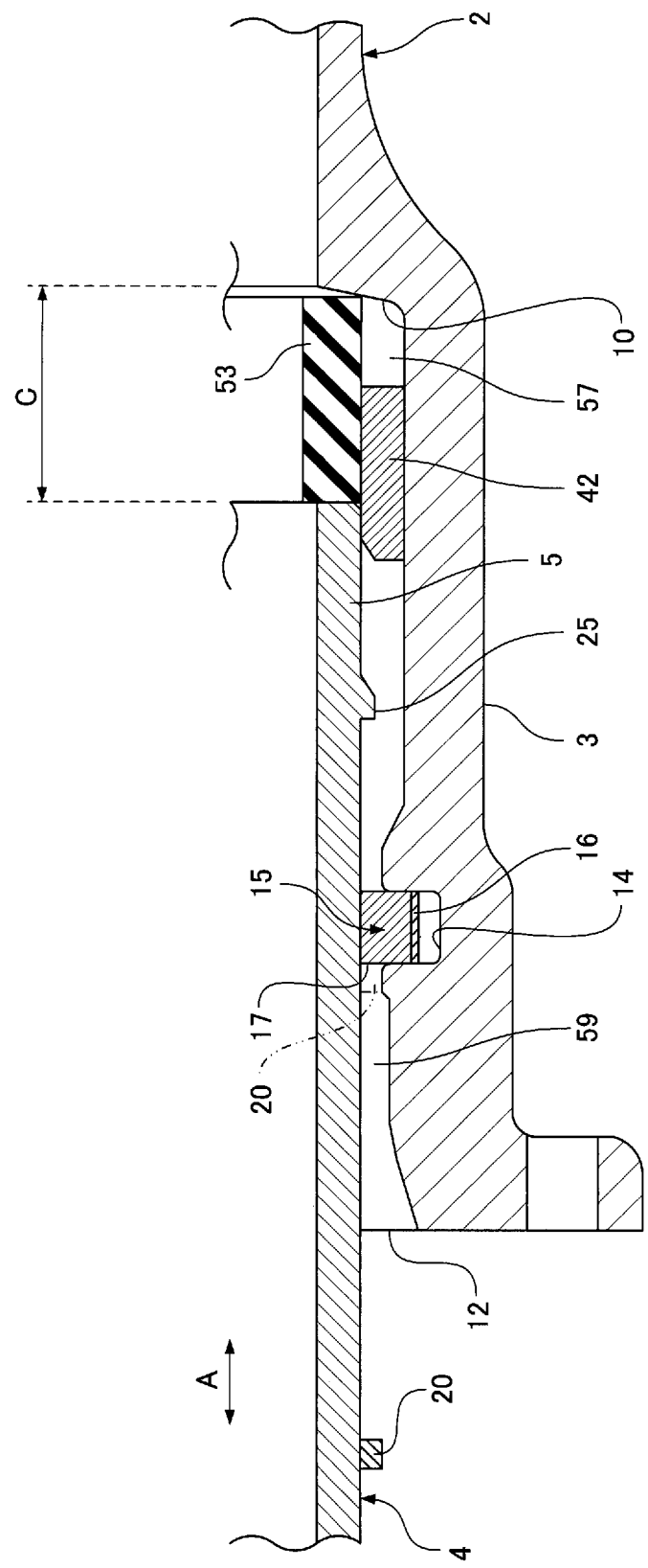
FIG. 9 is a diagram in the direction of arrow X-X in FIG. 8.
Figure 10:
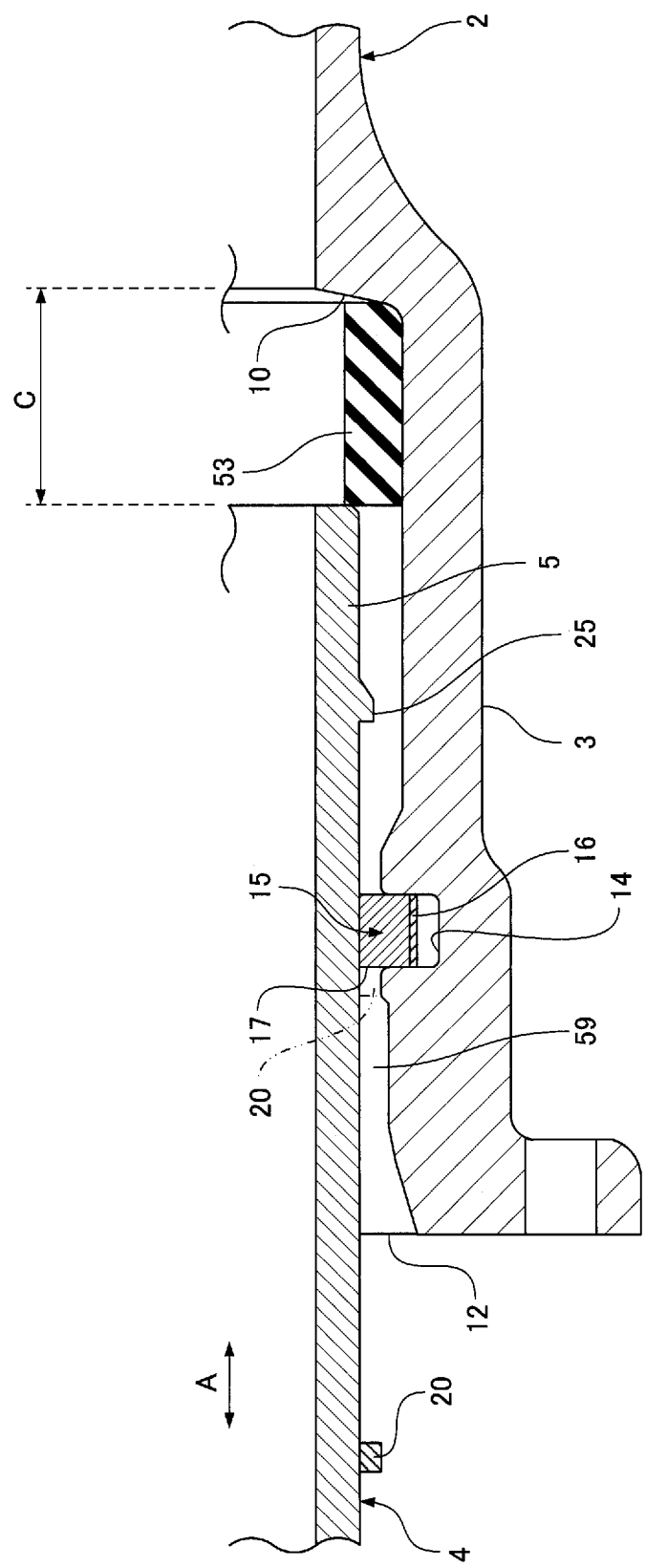
FIG. 10 is a diagram in the direction of arrow Y-Y in FIG. 8.
Figure 12:
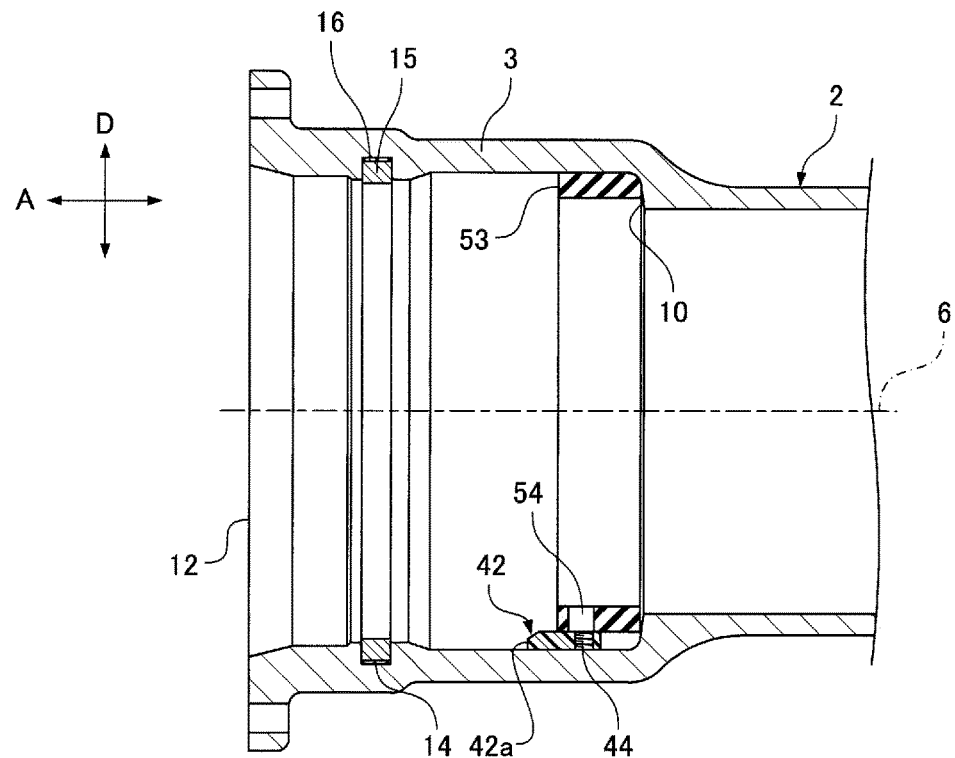
FIG. 12 is a cross-sectional view illustrating the procedure of joining pipes by using the centering device.

Then, the spacer 53 is set to the inner periphery of the socket 3. Thereafter, as illustrated in FIG. 12, part of the spacer 53 is deformed inward in the pipe radial direction, and the support members 42 of the centering device 41 is inserted between the outer peripheral surface of the spacer 53 and the inner peripheral surface of the socket 3. As illustrated in FIG. 8, any one of the support members 42 is set at a lowermost part 56 of the inner peripheral surface of the socket 3, and the remaining two support members 42 are set at both side parts 57 each separated from the lowermost part 56 by a predetermined angle in a pipe circumferential direction G. In this case, the support members 42 set at the both side parts 57 are sandwiched between the outer peripheral surface of the spacer 53 and the inner peripheral surface of the socket 3 and thus unlikely to have positional shift in the pipe circumferential direction G.

As illustrated in FIG. 12, the one end part 42a of the support member 42 further protrudes toward the opening end 12 of the socket 3 than the spacer 53 when the support member 42 is sandwiched between the outer peripheral surface of the spacer 53 and the inner peripheral surface of the socket 3.

Figure 13:
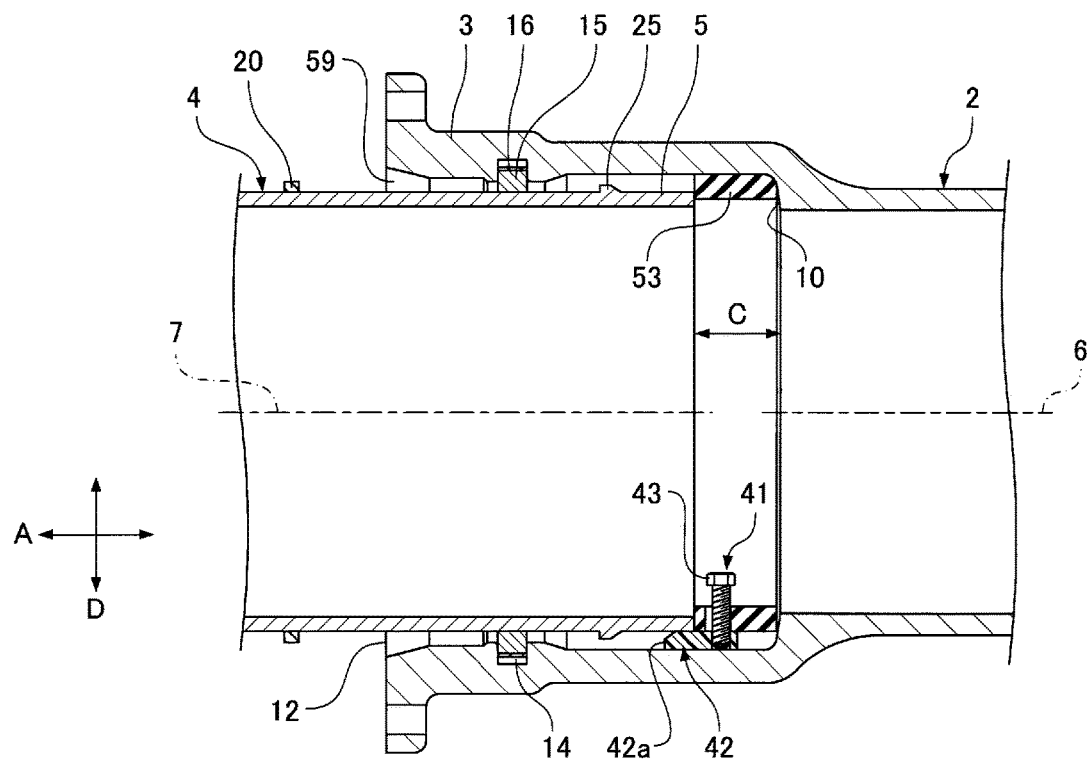
FIG. 13 is a cross-sectional view illustrating the procedure of joining pipes by using the centering device.
Figure 14:
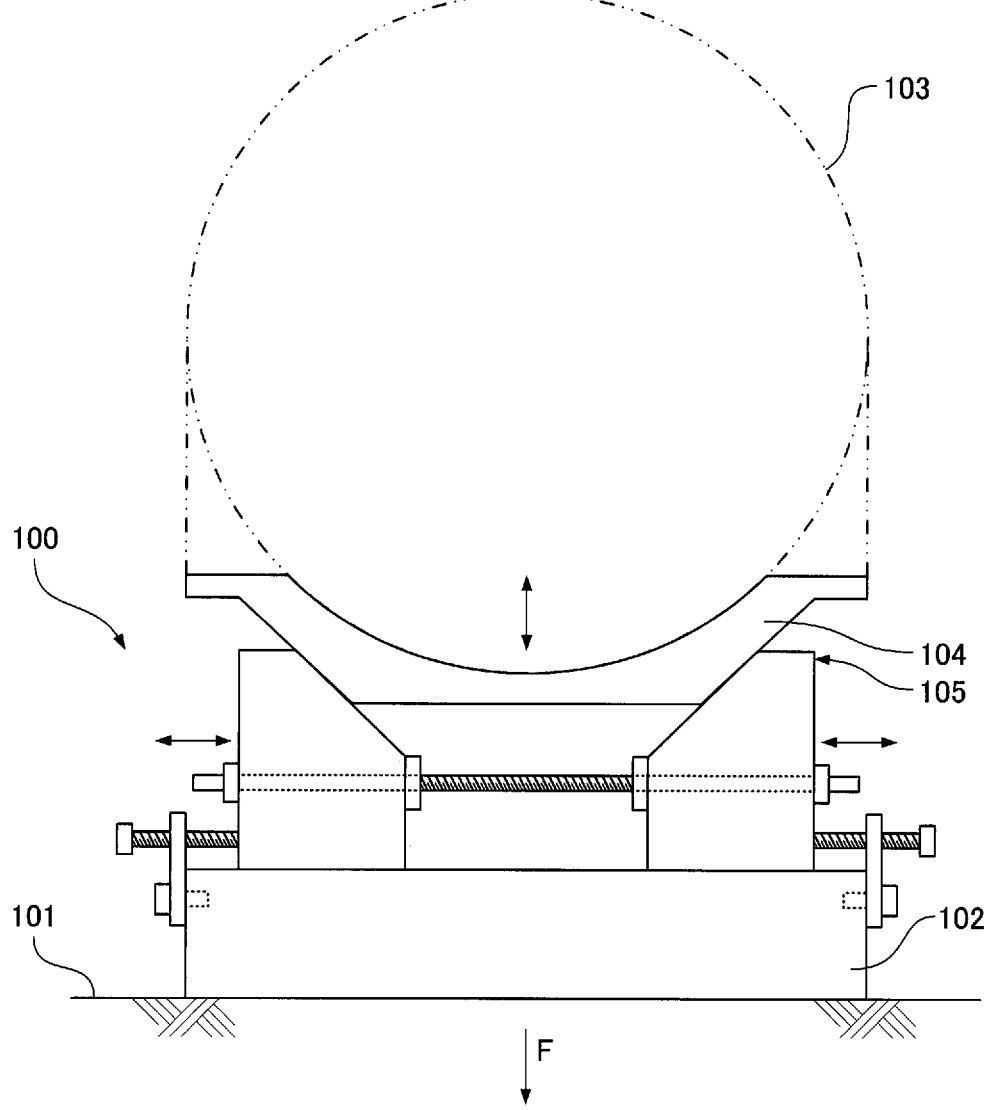
FIG. 14 is a diagram of a conventional pipe centering device.

Subsequently, as illustrated in FIG. 13, the position adjustment member 43 is inserted into the through-hole 54 of the spacer 53 and screwed into the screw hole 44 of the support member 42 set at the lowermost part 56. Thereafter, the other pipe 4 is hanged by a crane or the like, and the spigot 5 is inserted into the socket 3 of the one pipe 2 until the leading end of the spigot 5 of the other pipe 4 contacts the spacer 53. Accordingly, the one end part 42a of each support member 42 is inserted between the inner peripheral surface of the socket 3 and the outer peripheral surface of the end part of the spigot 5. In this state, since a lower part of the end part of the spigot 5 is supported by the three support members 42, the spigot 5 is stabilized.

After the protrusion 25 of the spigot 5 passes through the inner periphery of the lock ring 15 as the spigot 5 of the other pipe 4 is inserted into the socket 3 of the one pipe 2 as the aforementioned, the diameter increasing jig is removed to decrease the diameter of the lock ring 15.

Thereafter, as the position adjustment member 43 is rotated in one direction, the support member 42 set at the lowermost part 56 is tilted, the tilt angle E is increased, the spigot 5 is moved up by the support member 42, and the axial center 7 of the other pipe 4 is increased as illustrated in FIGS. 5 to 8. As the position adjustment member 43 is rotated in the other direction, the tilt angle E of the support member 42 set at the lowermost part 56 is decreased, the spigot 5 is moved down by the support member 42, and the axial center 7 of the other pipe 4 is decreased. Accordingly, the axial center 7 of the other pipe 4 is aligned with the axial center 6 of the one pipe 2, and a gap 59 having a size with which the backup ring 20 can be inserted into the gap 59 is formed on the entire circumference between the inner peripheral surface of the socket 3 and the outer peripheral surface of the spigot 5.

After the centering is performed in this manner, a pipe support tool such as a block is used to support the other pipe 4 at a height at which the centering is achieved, and the crane is removed from the other pipe 4. Thereafter, as illustrated with a virtual line in FIG. 5, the backup ring 20 is moved relative to the spigot 5 in the pipe axial direction A, inserted into the gap 59 between the inner peripheral surface of the socket 3 and the outer peripheral surface of the spigot 5 through the opening end 12 of the socket 3, and made contact with the side surface 17 of the lock ring 15.

Thereafter, the seal member 11 is moved relative to the spigot 5 in the pipe axial direction A and inserted into the gap 59 between the inner peripheral surface of the socket 3 and the outer peripheral surface of the spigot 5. In addition, the press ring 21 is moved relative to the spigot 5 in the pipe axial direction A, made contact with the opening end surface of the socket 3, and attached to the socket 3 by using the T-head bolts 22 and the nuts 23.

Thereafter, the position adjustment member 43 is removed from the support member 42 set at the lowermost part 56, and the spacer 53 is removed from the gap between the bottom end surface 10 of the socket 3 and the end part of the spigot 5. Then, all remaining support members 42 are removed from the inside of the socket 3 through the gap between the bottom end surface 10 of the socket 3 and the end part of the spigot 5. Accordingly, as illustrated in FIG. 1, the one pipe 2 and the other pipe 4 are joined with each other, and the bottom end surface 10 of the socket 3 and the end part of the spigot 5 are separated from each other at the predetermined interval C.

Figure 5:
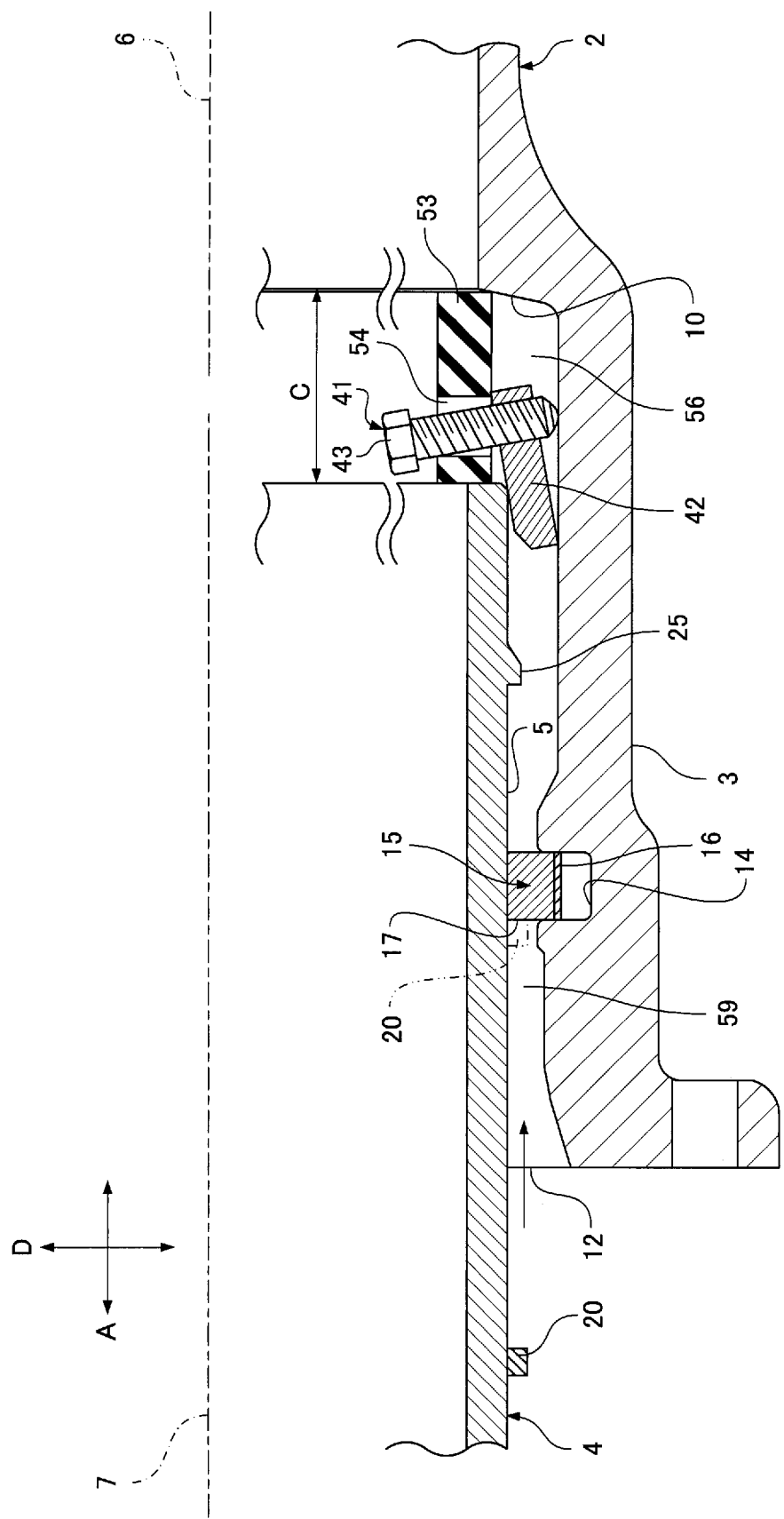
FIG. 5 is a cross-sectional view when the centering device is used.
Figure 6:
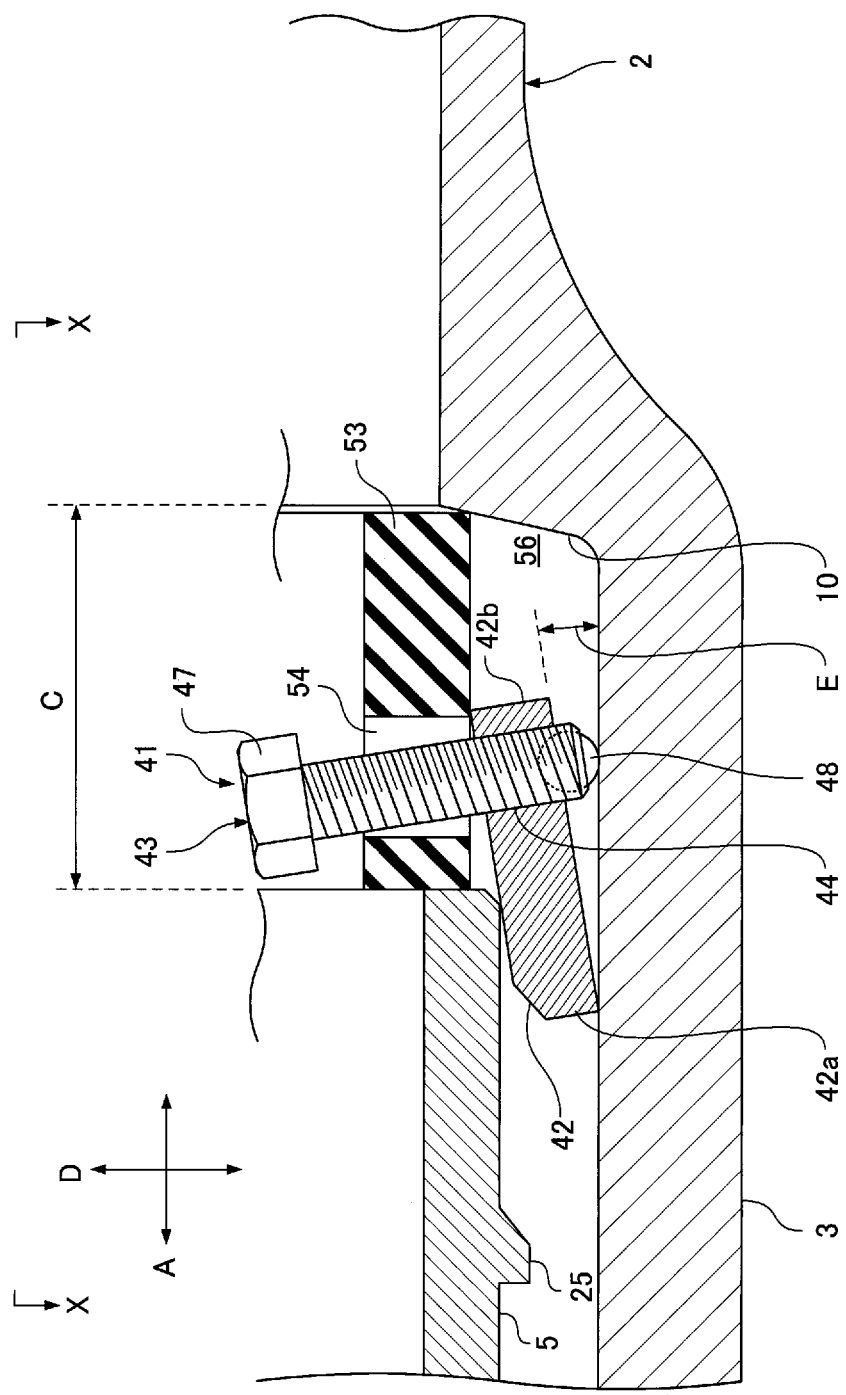
FIG. 6 is a cross-sectional view in which part of FIG. 5 is enlarged.
Figure 7:
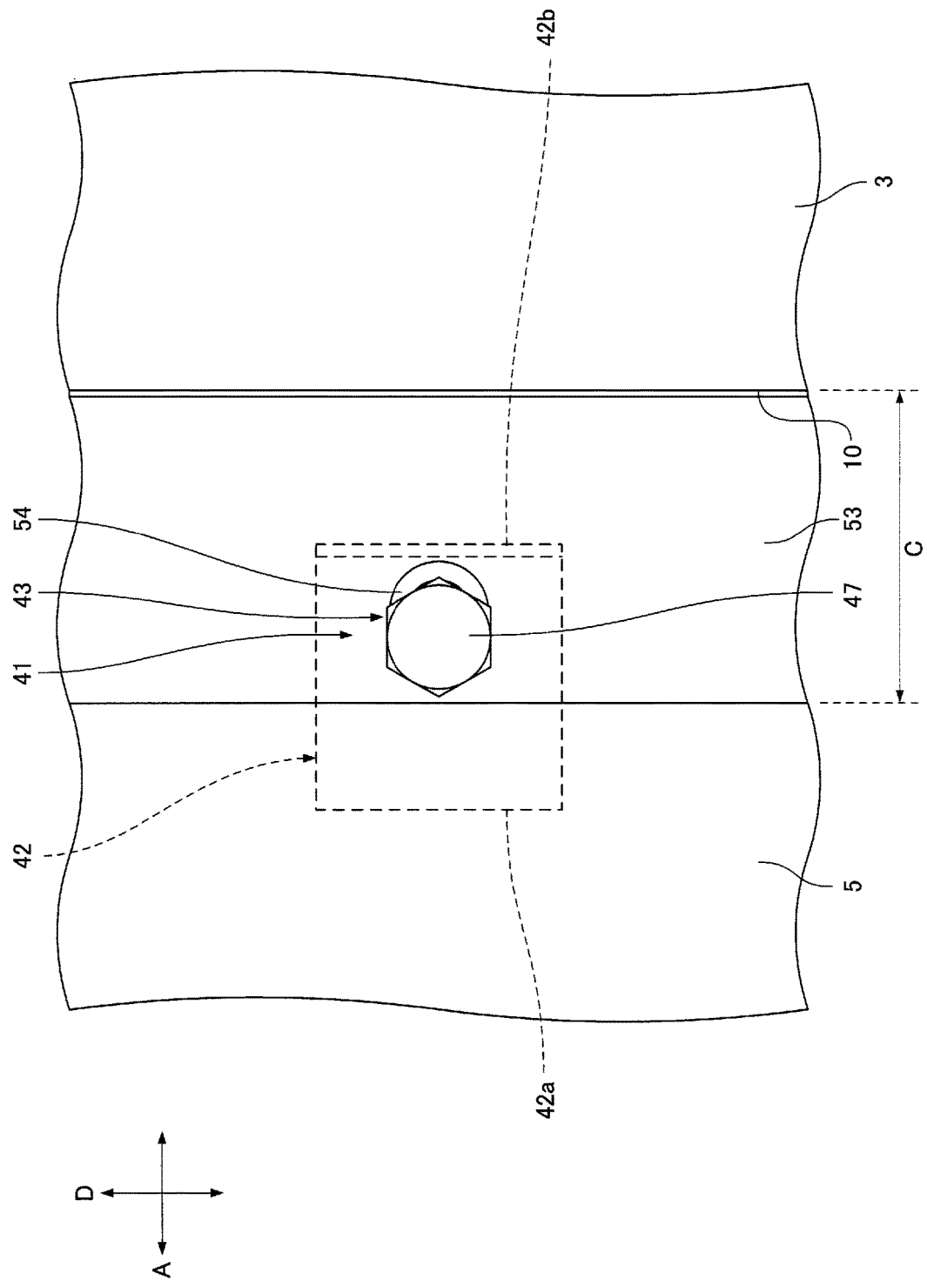
FIG. 7 is a diagram in the direction of arrow X-X in FIG. 6.

In the centering work using the centering device 41 as the aforementioned, since each support member 42 and the position adjustment member 43 of the centering device 41 are supported on the inner peripheral surface of the socket 3 as illustrated in FIGS. 5 and 6, any downward reaction force generated when the end part of the spigot 5 is moved up by the support member 42 is received by the inner peripheral surface of the socket 3. Accordingly, the posture of the support member 42 is stabilized, and accurate centering can be performed in the up-down direction.

In addition, since the centering device 41 has a simple structure including the support member 42 and the position adjustment member 43 of a screw type, reduction in the size and weight of the centering device 41 can be achieved. Moreover, since the support member 42 is displaced by the screw and the tilt angle E is changed as illustrated in FIG. 6, the tilt angle E can be gradually changed in accordance with the pitch of the screw. Accordingly, the position of the axial center 7 of the other pipe 4 relative to the axial center 6 of the one pipe 2 can be easily finely adjusted.

In addition, since the bolt body 47 is rotated relative to the spherical body 48 contacting the inner peripheral surface of the socket 3 when the position adjustment member 43 is rotated to change the tilt angle E of the support member 42, the inner peripheral surface of the socket 3 can be prevented from being damaged as the spherical body 48 slidably contacts the inner peripheral surface of the socket 3.

In addition, since the support members 42 set at the both side parts 57 are sandwiched between the outer peripheral surface of the spacer 53 and the inner peripheral surface of the socket 3 as illustrated in FIGS. 6 and 8 to 10, positional shift of the support member 42 in the pipe circumferential direction G can be prevented. Moreover, in the centering device 41 set at the lowermost part 56, the support member 42 is sandwiched between the outer peripheral surface of the spacer 53 and the inner peripheral surface of the socket 3, and the position adjustment member 43 is inserted into the through-hole 54 of the spacer 53. Accordingly, positional shift of the centering device 41 in the pipe circumferential direction G and the pipe axial direction A can be prevented. In this manner, the spacer 53 has a function to position the centering device 41 as the aforementioned in addition to a function to maintain the predetermined interval C between the bottom end surface 10 of the socket 3 and the end part of the spigot 5.

In the aforementioned embodiment, as illustrated in FIG. 8, the centering device 41 is set at the lowermost part 56 in the pipe circumferential direction G, and only the support members 42 are set at the both side parts 57. However, the support members 42 may not be set at the both side parts 57. In addition, although the centering device 41 is set at one place in the pipe circumferential direction G, the centering devices 41 may be set at a plurality of places. Moreover, the centering device 41 may be set at a place other than the lowermost part 56 in the pipe circumferential direction G.

The pipes 2 and 4 are ductile cast iron pipes in the aforementioned embodiment, but may be pipes other than ductile cast iron pipes.

In the aforementioned embodiment, as illustrated in FIG. 1, the bottom end surface 10 of the socket 3 and the end part of the spigot 5 are separated from each other at the predetermined interval C. The predetermined interval C is provided to allow relative movement of the socket 3 and the spigot 5 when the pipe joint 1 receives external force that would cause contraction in the pipe axial direction A under influence of ground deformation such as earth quake. When force that moves a pipe in a contraction direction acts due to water pressure in the pipe at a part other than a straight pipe part of a pipe line, for example, at a curved pipe part of a pipe line, a liner for movement prevention is sometimes inserted between the bottom end surface 10 of the socket 3 and the end part of the spigot 5 after the pipes are joined with each other. The liner is a cylindrical member including a plurality of metal members divided from each other in the circumferential direction. When such a liner is provided, the aforementioned predetermined interval C is selected so that an interval suitable for setting the liner is provided.

In the aforementioned embodiment, the pipe joint 1 includes the lock-ring pressing member 16 as illustrated in FIG. 1, but the present invention is also applicable to a pipe joint including no lock-ring pressing member 16. The lock-ring pressing member 16 is not limited to a substantially annular member but may be any member having a function to press the lock ring 15 against the outer peripheral surface of the spigot 5. For example, the lock-ring pressing member 16 may include a plurality of elastic members disposed in the circumferential direction.

What is claimed is:

1. A pipe-joining centering device for aligning, with an axial center of a first pipe, an axial center of a second pipe when a spigot of the second pipe is to be inserted into a socket of the first pipe, the pipe-joining centering device comprising:
    a support member configured to support an end part of the spigot, the support member being tillable in a pipe radial direction between an inner peripheral surface of the socket and an outer peripheral surface of the spigot; and
    a position adjustment member configured to tilt the support member in the pipe radial direction,
    wherein the support member and the position adjustment member are supported on the inner peripheral surface of the socket,
    wherein a leading end part of the position adjustment member in the pipe radial direction contacts the inner peripheral surface of the socket,
    wherein the socket has an opening at an end part,
    wherein the support member has a first end part facing a socket opening side and a second end part facing a socket bottom side, the support member being tillable so that the first end part is supported on the inner peripheral surface of the socket and the second end part is positioned higher than the first end part, and
    wherein the position adjustment member is configured to change a tilt angle of the support member relative to the inner peripheral surface of the socket.

2. The pipe-joining centering device according to claim 1, wherein the position adjustment member penetrates through the support member in the pipe radial direction and is screwed to the support member through a screw at a penetration part, and wherein, as the position adjustment member is rotated, the support member is displaced by the screw and the tilt angle of the support member is changed.

3. The pipe-joining centering device according to claim 2, wherein the position adjustment member comprises an adjustment member body and a spherical body provided at a leading end part of the adjustment member body, and wherein the spherical body contacts the inner peripheral surface of the socket and is rotatable relative to the adjustment member body.

4. A pipe-joining centering device for aligning, with an axial center of a first pipe, an axial center of a second pipe when a spigot of the second pipe is to be inserted into a socket of the first pipe, the pipe joining centering device comprising:

a support member configured to support an end part of the spigot, the support member being tiltable in a pipe radial direction between an inner peripheral surface of the socket and an outer peripheral surface of the spigot; and a position adjustment member configured to tilt the support member in the pipe radial direction, wherein the support member and the position adjustment member are supported on the inner peripheral surface of the socket, wherein the support member is sandwiched between a spacer and the inner peripheral surface of the socket, the spacer being configured to maintain a predetermined interval between a basal end part of the socket and the end part of the spigot, and wherein the position adjustment member is inserted into a through-hole formed in the spacer.

\* \* \* \* \*